United States Patent
Rajput et al.

(10) Patent No.: US 11,570,689 B2
(45) Date of Patent: Jan. 31, 2023

(54) METHODS, SYSTEMS, AND COMPUTER READABLE MEDIA FOR HIDING NETWORK FUNCTION INSTANCE IDENTIFIERS

(71) Applicant: Oracle International Corporation, Redwood Shores, CA (US)

(72) Inventors: Jay Rajput, Bangalore (IN); Virendra Singh, Bangalore (IN); Amarnath Jayaramachar, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/314,300

(22) Filed: May 7, 2021

(65) Prior Publication Data
US 2022/0361085 A1    Nov. 10, 2022

(51) Int. Cl.
*H04W 12/02*    (2009.01)
*H04W 40/24*    (2009.01)
(Continued)

(52) U.S. Cl.
CPC ............ *H04W 40/24* (2013.01); *H04L 61/35* (2013.01); *H04L 61/4541* (2022.05);
(Continued)

(58) Field of Classification Search
CPC ........................... H04W 40/22; H04W 40/246
See application file for complete search history.

(56) References Cited

U.S. PATENT DOCUMENTS 1,872,857 A     8/1932   Wesson et al.
5,835,087 A    11/1998   Herz et al.
(Continued)

FOREIGN PATENT DOCUMENTS

CN       1964316         5/2007
CN    103039049 B        8/2016
(Continued)

OTHER PUBLICATIONS

Corrected Notice of Allowability for U.S. Appl. No. 15/003,647 (dated Jun. 28, 2018).
(Continued)

*Primary Examiner* — Michael T Vu
(74) *Attorney, Agent, or Firm* — Jenkins, Wilson, Taylor & Hunt, P.A.

(57) ABSTRACT

Methods, systems, and computer readable media for hiding network function (NF) instance identifiers (IDs) in communications networks are disclosed. One method for hiding NF instance IDs in a communications network occurs at an NF repository function (NRF) comprising at least one processor. The method comprises: receiving, from a first NF, an NF registration request message for registering a first NF instance of the first NF, wherein the NF registration request message includes a first NF instance ID for identifying the first NF instance; storing, in a data store, a mapping between the first NF instance ID and at least one pseudo NF instance ID, wherein the data store includes mappings between NF instance IDs and related pseudo NF instance IDs; and generating and sending, to the first NF, an NF registration response message including the at least one pseudo NF instance ID for identifying the first NF instance.

20 Claims, 10 Drawing Sheets

(51) Int. Cl.
  *H04W 8/26* (2009.01)
  *H04W 80/10* (2009.01)
  *H04W 60/00* (2009.01)
  *H04L 61/00* (2022.01)
  *H04L 61/4541* (2022.01)
(52) U.S. Cl.
  CPC ............. *H04W 8/26* (2013.01); *H04W 12/02* (2013.01); *H04W 60/00* (2013.01); *H04W 80/10* (2013.01)

(56) References Cited

U.S. PATENT DOCUMENTS

| | | |
|---|---|---|
| 6,185,612 B1 | 2/2001 | Jensen et al. |
| 6,298,383 B1 | 10/2001 | Gutman et al. |
| 7,266,837 B2 | 9/2007 | Monjas-Llorente et al. |
| 8,127,016 B2 | 2/2012 | Westman et al. |
| 8,171,032 B2 | 5/2012 | Herz |
| 8,218,459 B1 | 7/2012 | Stucker |
| 8,218,490 B2 | 7/2012 | Rydnell et al. |
| 8,626,157 B2 | 1/2014 | Nas et al. |
| 8,929,360 B2 | 1/2015 | Agarwal et al. |
| 9,094,819 B2 | 7/2015 | McCann et al. |
| 9,253,163 B2 | 2/2016 | Donovan |
| 9,967,148 B2 | 5/2018 | Goyal et al. |
| 10,033,736 B2 | 7/2018 | McCann |
| 10,547,613 B1 | 1/2020 | Roths et al. |
| 10,834,571 B1 | 11/2020 | Yau et al. |
| 2003/0227894 A1 | 12/2003 | Wang et al. |
| 2005/0235000 A1 | 10/2005 | Keil |
| 2006/0078119 A1 | 4/2006 | Jee et al. |
| 2006/0155871 A1 | 7/2006 | Ilkka et al. |
| 2006/0259759 A1 | 11/2006 | Maino et al. |
| 2007/0019616 A1 | 1/2007 | Rantapuska et al. |
| 2007/0250642 A1 | 10/2007 | Thubert et al. |
| 2007/0297419 A1 | 12/2007 | Askerup et al. |
| 2008/0010669 A1 | 1/2008 | Aittola et al. |
| 2008/0039104 A1 | 2/2008 | Gu et al. |
| 2009/0080440 A1 | 3/2009 | Balyan et al. |
| 2009/0165017 A1 | 6/2009 | Syed et al. |
| 2009/0232011 A1 | 9/2009 | Li et al. |
| 2009/0265467 A1 | 10/2009 | Peles |
| 2009/0305684 A1 | 12/2009 | Jones et al. |
| 2009/0313379 A1 | 12/2009 | Rydnell et al. |
| 2010/0291923 A1 | 11/2010 | Zhou et al. |
| 2011/0165901 A1 | 7/2011 | Baniel et al. |
| 2011/0195710 A1 | 8/2011 | Nas et al. |
| 2011/0302244 A1 | 12/2011 | McCann et al. |
| 2012/0155389 A1 | 6/2012 | McNamee et al. |
| 2012/0157047 A1 | 6/2012 | Chen et al. |
| 2012/0158994 A1 | 6/2012 | McNamee et al. |
| 2012/0226814 A1 | 9/2012 | Stucker |
| 2013/0097418 A1 | 4/2013 | Bhatt et al. |
| 2013/0151845 A1 | 6/2013 | Donovan |
| 2013/0185767 A1 | 7/2013 | Tirupachur Comerica et al. |
| 2013/0290722 A1 | 10/2013 | Kall et al. |
| 2016/0352696 A1 | 12/2016 | Essigmann et al. |
| 2017/0012824 A1 | 1/2017 | Goyal et al. |
| 2017/0214691 A1 | 7/2017 | McCann |
| 2019/0260803 A1 | 8/2019 | Bykampadi et al. |
| 2020/0036754 A1 | 1/2020 | Livanos |
| 2020/0186359 A1 | 6/2020 | Chan et al. |
| 2020/0245139 A1 | 7/2020 | Nakarmi et al. |
| 2021/0083965 A1* | 3/2021 | Taft ...................... H04L 1/0016 |
| 2021/0250172 A1 | 8/2021 | Choyi et al. |
| 2021/0288802 A1 | 9/2021 | Muhanna et al. |
| 2021/0385286 A1* | 12/2021 | Wang .................. H04L 61/4541 |
| 2022/0052992 A1* | 2/2022 | Zhang ...................... G06F 21/44 |
| 2022/0124468 A1* | 4/2022 | Lu ........................... H04L 67/60 |

FOREIGN PATENT DOCUMENTS

| | | |
|---|---|---|
| CN | 111163473 A | 5/2020 |
| EP | 1 848 150 A1 | 10/2007 |
| EP | 1 873 980 A1 | 1/2008 |
| KR | 10-1506232 | 3/2015 |
| WO | WO 2007/125498 A1 | 11/2007 |
| WO | WO 2011/156274 A2 | 12/2011 |
| WO | WO 2022/043130 A1 | 3/2022 |

OTHER PUBLICATIONS

Communication pursuant to Article 94(3) EPC for European Patent Application Serial No. 11 792 956.2 (dated Apr. 23, 2018).
Notice of Allowance and Fee(s) Due for U.S. Appl. No. 15/003,647 (dated Mar. 7, 2018).
Notice of Allowance and Fee(s) Due for U.S. Appl. No. 14/795,601 (dated Dec. 28, 2017).
Applicant Initiated Interview Summary for U.S. Appl. No. 14/795,601 (dated Nov. 24, 2017).
Non-Final Office Action for U.S. Appl. No. 15/003,647 (dated Oct. 10, 2017).
Non-Final Office Action for U.S. Appl. No. 14/795,601 (dated Aug. 18, 2017).
Notification to grant a Chinese patent for Chinese Patent Application No. ZL201180032307.4 (dated Jun. 23, 2016).
Extended European Search Report for European Application No. 11792956.2 (dated Feb. 8, 2016).
Notification of the Third Office Action for Chinese Application No. 201180032307.4 (dated Jan. 25, 2016).
"RADIUS," https://en.wikipedia.org/wiki/RADIUS#Accounting, pp. 1-17 (Nov. 27, 2015).
Notice of Allowance for U.S. Appl. No. 13/712,481 dated Oct. 20, 2015.
Notice of Allowance for U.S. Appl. No. 13/712,481 dated Sep. 25, 2015.
Notification of the Second Office Action for Chinese Application No. 201180032307.4 (dated Jul. 17, 2015).
Commonly-Assigned, co-pending U.S. Appl. No. 14/795,601 for "Methods, Systems, and Computer Readable Media for Selective Diameter Topology Hiding," (Unpublished, filed Jul. 9, 2015).
Non-Final Office Action for U.S. Appl. No. 13/832,137 (dated Jun. 2, 2015).
Non-Final Office Action for U.S. Appl. No. 13/712,481 (dated Apr. 29, 2015).
Notice of Allowance for U.S. Appl. No. 13/154,119 dated Apr. 16, 2015.
Notice of Allowance and Applicant Initiated Interview Summary for U.S. Appl. No. 13/154,119 dated Mar. 17, 2015.
Advisory Action Before the Filing of an Appeal Brief for U.S. Appl. No. 13/712,481 (dated Mar. 11, 2015).
Email Regarding Decision to Grant for Korean Patent Application No. 2012-7034449 (dated Mar. 2, 2015).
Final Office Action for U.S. Appl. No. 13/712,481 (dated Dec. 3, 2014).
Notification of the First Office Action for Chinese Patent Application No. 201180032307.4 (dated Nov. 4, 2014).
Office Action for Korean Patent Application No. 2012-7034449 (dated Oct. 14, 2014).
Non-Final Office Action for U.S. Appl. No. 13/712,481 (dated May 8, 2014).
Notice of Preliminary Rejection for Korean Patent Application No. 2012-7034449 (dated Apr. 25, 2014).
Advisory Action for U.S. Appl. No. 13/154,119 dated Jan. 22, 2014.
Zhang et al., "TOHIP: A topology-hiding multipath routing protocol in mobile ad hoc networks," Ad Hoc Networks 21, pp. 109-122 (2014).
Final Office Action for U.S. Appl. No. 13/154,119 dated Oct. 25, 2013.
Notice of Allowance and Fee(s) Due for U.S. Appl. No. 13/021,402 (dated Sep. 9, 2013).
Non-Final Office Action for U.S. Appl. No. 13/154,119 dated May 2, 2013.
Communication of European publication number and information on the application of Article 67(3) EPC for European Patent Application No. 11792956.2 (dated Mar. 13, 2013).

(56) References Cited

OTHER PUBLICATIONS

"EliteDSC—LTE Roaming," http://www.elitecore.com/telecompractices/lteroaming.html, pp. 1-2 (Copyright 2013).

Non-Final Office Action for U.S. Appl. No. 13/021,402 (dated Nov. 8, 2012).

Notification of Transmittal of the International Search Report and the Written Opinion of the International Searching Authority, or the Declaration for International Application No. PCT/US2011/039285 (dated Feb. 9, 2012).

Notification of Transmittal of the International Search Report and the Written Opinion of the International Searching Authority, or the Declaration for International Application No. PCT/US2011/023752 (dated Oct. 26, 2011).

"Topology Hiding," Chapter 13, Cisco Unified Border Element (SP Edition) Configuration Guide: Distributed Model, pp. 13-1-13-10 (Mar. 29, 2011).

"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 10)," 3GPP TS 29.272, V10.2.0, pp. 1-95 (Mar. 2011).

3GPP, "3rd Generation Partnership Project; Technical Specification Group Core Network and Terminals; InterWorking Function (IWF) Between MAP Based and Diameter Based Interfaces (Release 9)," 3GPP TS 29.305 V9.0.0, pp. 1-63 (Dec. 2009).

Chiba et al., "Dynamic Authorization Extensions to Remote Authentication Dial In User Service (RADIUS)," RFC 5176, pp. 1-31 (Jan. 2008).

"Features—Kamailio (OpenSER) SIP Server," http://www.kamailio.org/w/features/, pp. 1-3 (Copyright 2008-2015).

Rouse, M., "Platform," searchservervirtualization.techtarget.com/definition/platform, pp. 1-2 (Sep. 2006).

Calhoun et al., "Diameter Base Protocol," RFC 3588, pp. 1-147 (Sep. 2003).

Calhoun et al., "Diameter Base Protocol," draft-ietf-aaa-diameter-07, Section 6.3, p. 68 (Jul. 2001).

Calhoun et al., "Diameter Base Protocol," The Internet Society, pp. 1-64 (Mar. 2001).

Rigney et al., "RADIUS Accounting," RFC 2866, pp. 1-28 (Jun. 2000).

Rigney et al., "Remote Authentication Dial In User Service (RADIUS)," RFC 2865, pp. 1-68 (Jun. 2000).

Farago et al., "Virtual path network topology optimization using random graphs," INFOCOM '99, 18th Annual Joint Conference of the IEEE Computer and Communications Societies, vol. 2, pp. 491-496 (Mar. 1999).

Goldschlag et al., "Hiding Routing Information," Springer Berlin Heidelberg, First International Workshop Cambridge, U.K., May 30-Jun. 1, 1996, Information Hiding Lecture Notes in Computer Science, vol. 1174, pp. 137-150 (1996).

Commonly-assigned, co-pending U.S. Appl. No. 17/314,329 for "Methods, Systems, and Computer Readable Media for Protecting Against Mass Network Function (NF) Deregistration Attacks," (Unpublished, filed May 7, 2021).

Commonly-assigned, co-pending U.S. Appl. No. 17/314,382 for "Methods, Systems, and Computer Readable Media for Single-Use Authentication Messages," (Unpublished, filed May 7, 2021).

Commonly-assigned, co-pending U.S. Appl. No. 17/308,972 for "Methods, Systems, and Computer Readable Media For Generating and Using Single-Use Oauth 2.0 Access Tokens For Securing Specific Service-Based Architecture (SBA) Interfaces," (Unpublished, filed May 5, 2021).

Commonly-assigned, co-pending U.S. Appl. No. 17/236,775 for "Methods, Systems, and Computer Readable Media for Mitigating Network Function (NF) Update and Deregister Attacks," (Unpublished, filed Apr. 21, 2021).

"3rd Generation Partnership Project; Technical Specification Group Services and System Aspects; System architecture for the 5G System (5GS); Stage 2 (Release 17)," 3GPP TS 23.501, V17.0.0, pp. 1-489 (Mar. 2021).

"3rd Generation Partnership Project; Technical Specification Group Core Network and Terminals; 5G System; Network Function Repository Services; Stage 3 (Release 17)," 3GPP TS 29.510, V17.0.0, pp. 1-245 (Dec. 2020).

"3rd Generation Partnership Project; Technical Specification Group Core Network and Terminals; 5G System; Technical Realization of Service Based Architecture; Stage 3 (Release 17)," 3GPP TS 29.500, V17.1.0, pp. 1-90 (Dec. 2020).

Hardt, "The OAuth 2.0 Authorization Framework", Internet Engineering Task Force (IETF) Request for Comments (RFC) 6749, pp. 1-76 (2012).

"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).

"3rd Generation Partnership Project; Technical Specification Group Services and System Aspects; Security architecture and procedures for 5G system (Release 17)," 3GPP TS 33.501, V17.0.0, pp. 1-253 (Dec. 2020).

Leach et al., "A Universally Unique IDentifier (UUID) URN Namespace," Network Working Group, RFC 4122, pp. 1-32 (Jul. 2005).

Non-Final Office Action for U.S. Appl. No. 17/145,143 (dated Mar. 15, 2022).

Notification of Transmittal of the International Search Report and the Written Opinion of the International Searching Authority, or the Declaration for U.S. Patent Application Serial No. PCT/US2021/064102 (dated Apr. 7, 2022).

Non-Final Office Action for U.S. Appl. No. 17/314,382 (dated May 23, 2022).

Commonly-Assigned, co-pending U.S. Appl. No. 17/145,143 for "Methods, Systems, and Computer Readable Media for Preventing Subscriber Identifier Leakage," (Unpublished, filed Jan. 8, 2021).

"3rd Generation Partnership Project; Technical Specification Group Core Network and Terminals; 5G System; Public Land Mobile Network (PLMN) Interconnection; Stage 3 (Release 16)," 3GPP TS 29.573, V16.4.0, pp. 1-95 (Sep. 2020).

"3rd Generation Partnership Project; Technical Specification Group Services and System Aspects; Security architecture and procedures for 5G system (Release 16)," 3GPP TS 33.501, V16.4.0, pp. 1-249 (Sep. 2020).

"3rd Generation Partnership Project; Technical Specification Group Core Network and Terminals; 5G System; Authentication Server Services; Stage 3 (Release 16)," 3GPP TS 29,509, V16.5.0 pp. 1-60 (Sep. 2020).

Notice of Allowance and Fee(s) Due for U.S. Appl. No. 17/145,143 (dated Sep. 2, 2022).

Notice of Allowance and Fee(s) Due and Examiner-Initiated Interview Summary for U.S. Appl. No. 17/145,143 (dated Aug. 11, 2022).

Non-Final Office Action for U.S. Appl. No. 17/308,972 (dated Aug. 5, 2022).

Notification of Transmittal of the International Search Report and the Written Opinion of the International Searching Authority, or the Declaration for International Application No. PCT/US2022/023894 (dated Aug. 1, 2022).

"3rd Generation Partnership Project; Technical Specification Group Services and System Aspects; Study on Enhancements to the Service-Based Architecture (Release 16)," 3GPP TR 23.742, V1.0.0, pp. 1-101 (Sep. 2018).

\* cited by examiner

500

| NF INSTANCE ID | PSEUDO NF INSTANCE IDs |
|---|---|
| ID1 | PID2, PID4, PID7 |
| ID2 | PID61, PID40, PID55, PID32, PID34 |
| ID3 | PID27, PID21, PID25 |
| ID4 | PID72, PID29, PID33, PID11 |
| ID5 | PID16, PID22, PID64, PID96 |

| MESSAGE/SERVICE TYPE | PSEUDO NF INSTANCE ID USAGE |
|---|---|
| NF REGISTRATION | NO |
| NF UPDATE | NO |
| NF DEREGISTRATION | NO |
| NF DISCOVERY | YES |
| NF PROFILE | YES |
| NF ACCESS TOKEN | YES |
| NF SUBSCRIPTION | YES |
| SBI | YES |

METHODS, SYSTEMS, AND COMPUTER READABLE MEDIA FOR HIDING NETWORK FUNCTION INSTANCE IDENTIFIERS

TECHNICAL FIELD

The subject matter described herein relates to enhancing security in fifth generation (5G) and subsequent generation communications networks. More particularly, the subject matter described herein relates to methods, systems, and computer readable media for hiding network function (NF) instance identifiers (IDs) in 5G and subsequent generation communications networks.

BACKGROUND

In fifth generation (5G) communications networks, a network node that provides service is referred to as a producer network function (NF). A network node that consumes services is referred to as a consumer NF. A network function can be both a producer NF and a consumer NF depending on whether it is consuming or providing service.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a NF repository function (NRF). The NRF maintains service profiles of available NF instances identifying the services supported by each NF instance. Consumer NFs can subscribe to receive information about producer NF instances that have registered with the NRF. In addition to consumer NFs, another type of network node that can subscribe to receive information about NF service instances is a service communication proxy (SCP). The SCP subscribes with the NRF and obtains reachability and service profile information regarding producer NF service instances. Consumer NFs connect to the SCP, and the SCP load balances traffic among producer NF service instances that provide the required service or directly routes the traffic to the destination producer NF instance.

In addition to the SCP, other examples of intermediate proxy nodes or groups of network nodes that route traffic between producer and consumer NFs include the security edge protection proxy (SEPP), the service gateway, and nodes in the 5G service mesh. The SEPP is the network node used to protect control plane traffic that is exchanged between different 5G public land mobile networks (PLMNs). As such, the SEPP performs various amounts of message filtering, policing, and topology hiding for application programming interface (API) messages.

However, there exists a need for improved security measures at one or more NFs.

SUMMARY

Methods, systems, and computer readable media for hiding network function (NF) instance identifiers (IDs) in communications networks are disclosed. One method for hiding NF instance IDs in a communications network occurs at an NF repository function (NRF) comprising at least one processor. The method comprises: receiving, from a first NF, an NF registration request message for registering a first NF instance of the first NF, wherein the NF registration request message includes a first NF instance ID for identifying the first NF instance; storing, in a data store, a mapping between the first NF instance ID and at least one pseudo NF instance ID, wherein the data store includes mappings between NF instance IDs and related pseudo NF instance IDs; and generating and sending, to the first NF, an NF registration response message including the at least one pseudo NF instance ID for identifying the first NF instance.

One example system for hiding NF instance IDs in a communications network includes an NRF comprising at least one processor and a memory. The NRF is configured for: receiving, from a first NF, an NF registration request message for registering a first NF instance of the first NF, wherein the NF registration request message includes a first NF instance ID for identifying the first NF instance; storing, in a data store, a mapping between the first NF instance ID and at least one pseudo NF instance ID, wherein the data store includes mappings between NF instance IDs and related pseudo NF instance IDs; and generating and sending, to the first NF, an NF registration response message including the at least one pseudo NF instance ID for identifying the first NF instance.

One example non-transitory computer readable medium comprising computer executable instructions embodied in the non-transitory computer readable medium that when executed by at least one processor of at least one computer cause the at least one computer to perform steps comprising: at an NRF comprising at least one processor: receiving, from a first NF, an NF registration request message for registering a first NF instance of the first NF, wherein the NF registration request message includes a first NF instance ID for identifying the first NF instance; storing, in a data store, a mapping between the first NF instance ID and at least one pseudo NF instance ID, wherein the data store includes mappings between NF instance IDs and related pseudo NF instance IDs; and generating and sending, to the first NF, an NF registration response message including the at least one pseudo NF instance ID for identifying the first NF instance.

According to an aspect of the subject matter described herein, a first NF may be configured for receiving, from an NRF, an NF registration response message including at least one pseudo NF instance ID for identifying a first NF instance of the first NF, wherein each of the at least one pseudo NF instance ID is different from a first NF instance ID for identifying the first NF instance; storing the at least one pseudo NF instance ID associated with the first NF instance ID; and using a first pseudo NF instance ID of the at least one pseudo NF instance ID for sender identification when sending a request or response message.

According to an aspect of the subject matter described herein, an NRF may be configured for receiving, from a consumer NF instance, an NF discovery request message including at least one query parameter; selecting, using the at least one query parameter and the data store, an NF profile including the first pseudo NF instance ID; sending, to the consumer NF instance, the NF profile including the first pseudo NF instance ID.

According to an aspect of the subject matter described herein, a first pseudo NF instance ID may be usable by a consumer NF instance to request an access token, an NF profile, or an NF subscription associated with the first NF instance.

According to an aspect of the subject matter described herein, a first pseudo NF instance ID may be usable by a consumer NF instance to communicate with the first NF instance via a service based interface (SBI).

According to an aspect of the subject matter described herein, an NRF may be configured for receiving a service request message for performing an action associated with a first NF instance, wherein the service request message comprises an ID for the first NF instance; determining, using the ID and a data store containing associations between NF instance IDs and related pseudo NF instance IDs, that the service request message is valid or invalid; in response to determining that the service request message is invalid, performing an invalid message action; and in response to determining that the service request message is valid, performing the action associated with the first NF instance.

According to an aspect of the subject matter described herein, an NF that hides NF instance IDs (e.g., by using pseudo NF instance IDs) may include a producer NF, a policy control function (PCF), a binding support function (BSF), a service communication proxy (SCP), a security edge protection proxy (SEPP), a network slice selection function (NSSF), a network exposure function (NEF), a unified data repository (UDR), or a 5GC NF.

According to an aspect of the subject matter described herein, an invalid message action may include discarding a request message or notifying a network operator or a management system.

According to an aspect of the subject matter described herein, a service request message may include an NF registration request message, an NF update request message, or an NF deregistration request message.

According to an aspect of the subject matter described herein, determining that a service request message (e.g., an NF registration request message, an NF update request message, or an NF deregistration request message) is invalid includes determining that an ID in the service request message is one of the one or more pseudo NF instance IDs associated with the first NF instance ID.

The subject matter described herein may be implemented in hardware, software, firmware, or any combination thereof. As such, the terms "function" "node" or "module" as used herein refer to hardware, which may also include software and/or firmware components, for implementing the feature being described. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 5 is a diagram illustrating example ID data indicating NF instance IDs and related pseudo NF instance IDs;

FIG. 6 is a diagram illustrating example ID usage data indicating message types and related pseudo NF instance ID usage;

DETAILED DESCRIPTION

Figure 1:
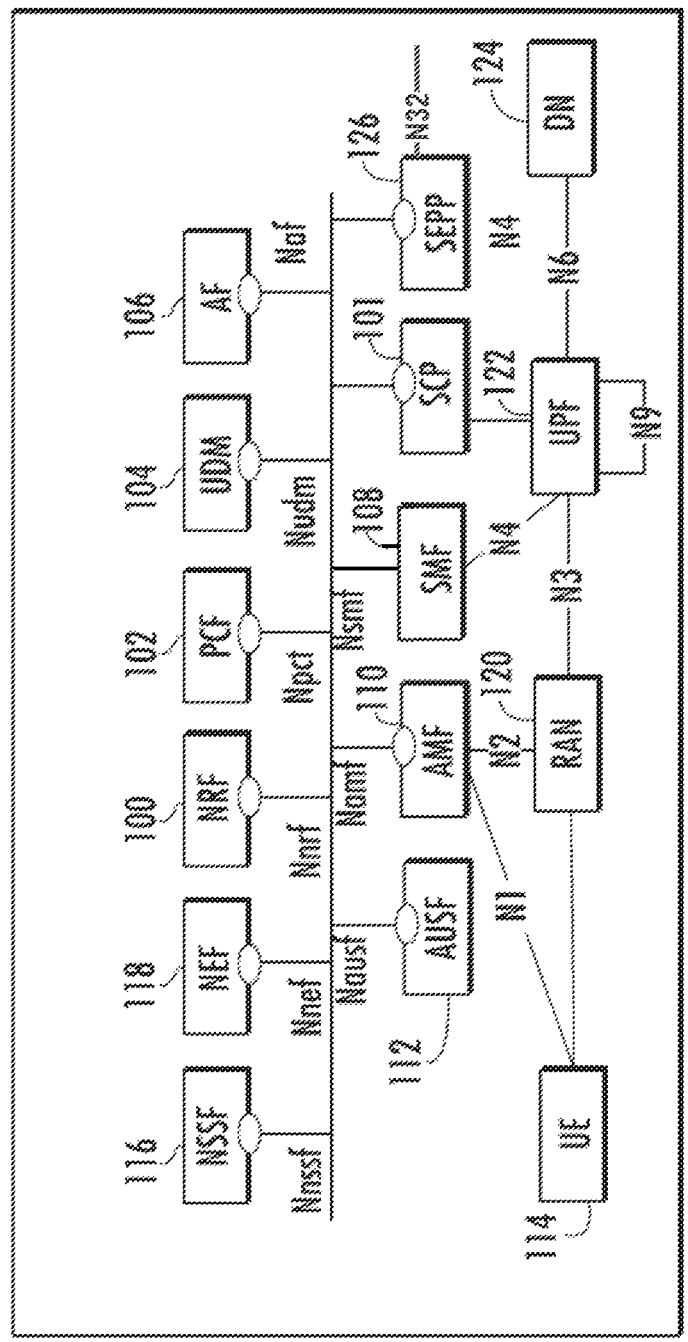
FIG. 1 is a network diagram illustrating an example fifth generation (5G) network architecture.

The subject matter described herein relates to methods, systems, and computer readable media for hiding network function (NF) instance identifiers (IDs) in fifth generation (5G) communications networks. In 5G communications networks, NF instance IDs are used to uniquely identify a 5G NF instance. For example, an NF repository function (NRF) uses NF instance IDs for NF management, NF discovery, and NF access token services. Further, consumer NFs use NF instance IDs for client credential assertion (CCA) based client authentication. NFs also use NF instance IDs for sharing their identification, e.g., an access and mobility management function (AMF) uses its NF instance ID during a UEContextManagement (UECM) service registration. Since an NF instance ID uniquely identifies an NF, exposing NF instance IDs outside their public land mobile network (PLMN) may implicitly expose the PLMN's topology the outside world. For example, NF instance IDs can leak from a visitor network because of compromised security in the visitor network, such as not using transport layer security (TLS) between NFs.

While a security edge protection proxy (SEPP) provides some security measures for inter-PLMN communications, the SEPP is unable to hide NF instance IDs as NF instance IDs can be embedded in access tokens which cannot be modified because of JSON Web Signature (JWS) signing. Further, NF instance IDs are used for NF update and NF deregistration service operations. Hence, leaked NF instance IDs can be misused (e.g., by a hacker) in denial of service (DoS) attacks, e.g., by sending unauthorized NF update or NF deregistration request messages.

In accordance with some aspects of the subject matter described herein, methods, systems, mechanisms, and/or techniques are disclosed for hiding NF instance IDs in a communications network by using pseudo NF instance IDs in lieu of NF instance IDs in various scenarios. For example, an NRF in accordance with various aspects described herein can generate and/or assign pseudo NF instance IDs during NF registration of an NF. In this example, the pseudo NF instance IDs may be shared with the NF in an NF registration response. In some embodiments, pseudo NF instance IDs may be used for identifying the NF in various scenarios (e.g., inter-PLMN communications), thereby mitigating leakage of NF instance IDs and related misuse. In some embodiments, e.g., to further mitigate NF instance ID misuse, actual NF instance IDs (but not pseudo NF instance IDs) may be used for NF registration, NF update, and NF deregistration.

Advantageously, by utilizing one or more techniques, systems, and/or methods described herein, a NRF or other entity may enhance security (e.g., prevent DoS attacks or other malicious actions) by using pseudo NF instance IDs and/or reducing the usage of NF instance IDs to NF registration, NF update, NF deregistration scenarios.

Reference will now be made in detail to various embodiments of the subject matter described herein, examples of which are illustrated in the accompanying drawings. Wherever possible, the same reference numbers will be used throughout the drawings to refer to the same or like parts.

FIG. 1 is a block diagram illustrating an example 5G system network architecture, e.g., a home 5G core (5GC) network. The architecture in FIG. 1 includes an NRF 100 and an SCP 101, which may be located in the same home public land mobile network (PLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs. In addition, using the methodologies described herein, SCP 101 may perform preferred NF location based selection and routing.

NRF 100 is a repository for NF or service profiles of producer NF instances. In order to communicate with a producer NF instance, a consumer NF or an SCP must obtain the NF or service profile or the producer NF instance from NRF 100. The NF or service profile is a JavaScript object notation (JSON) data structure defined in Third Generation Partnership Project (3GPP) Technical Specification (TS) 29.510. The NF or service profile definition includes at least one of a fully qualified domain name (FQDN), an Internet protocol (IP) version 4 (IPv4) address, or an IP version 6 (IPv6) address. In FIG. 1, any of the nodes (other than NRF 100) can be either consumer NFs or producer NFs, depending on whether they are requesting or providing services. In the illustrated example, the nodes include a policy control function (PCF) 102 that performs policy related operations in a network, a unified data management (UDM) function 104 that manages user data, and an application function (AF) 106 that provides application services. The nodes illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user devices, such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects UE 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

Security edge protection proxy (SEPP) 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN.

SEPP 126 may utilize an N32-c interface and an N32-f interface. An N32-c interface is a control plane interface between two SEPPs usable for performing an initial handshake (e.g., a TLS handshake) and negotiating various parameters for an N32-f interface connection and related message forwarding. An N32-f interface is a forwarding interface between two SEPPs usable for forwarding various communications (e.g., 5GC request messages) between a consumer NF and a producer NF after applying application level security protection.

One issue with the existing 5G architecture is that the existing 5G architecture can allow leakage of NF instance IDs to various entities, which can contribute to or allow malicious entities to perform various malicious actions, e.g., unauthorized or improper NF deregistration request message of an NF instance using a leaked or gleaned NF instance ID. For example, if a compromised NF in a trusted (but compromised or hacked) visitor PLMN (V-PLMN) has access to a home PLMN (H-PLMN), the compromised NF may receive an NF instance ID for identifying a particular NF instance via an NF discovery procedure. In this example, the compromised NF in a trusted V-PLMN can trigger or initiate a denial of service (DOS) attack by spoofing the particular NF instance and sending an NF deregistration request message using the NF instance ID it has obtained from the NF discovery procedure. Hence, even with existing authorization procedures, 5G architecture can benefit from enhanced security and/or related techniques that use temporary or pseudo NF instance IDs in lieu of actual NF instance IDs, thereby mitigating leakage of NF instance IDs and related misuse.

It will be appreciated that FIG. 1 is for illustrative purposes and that various nodes and/or modules, locations, and/or functionality described above in relation to FIG. 1 may be changed, altered, added, or removed.

Figure 2:
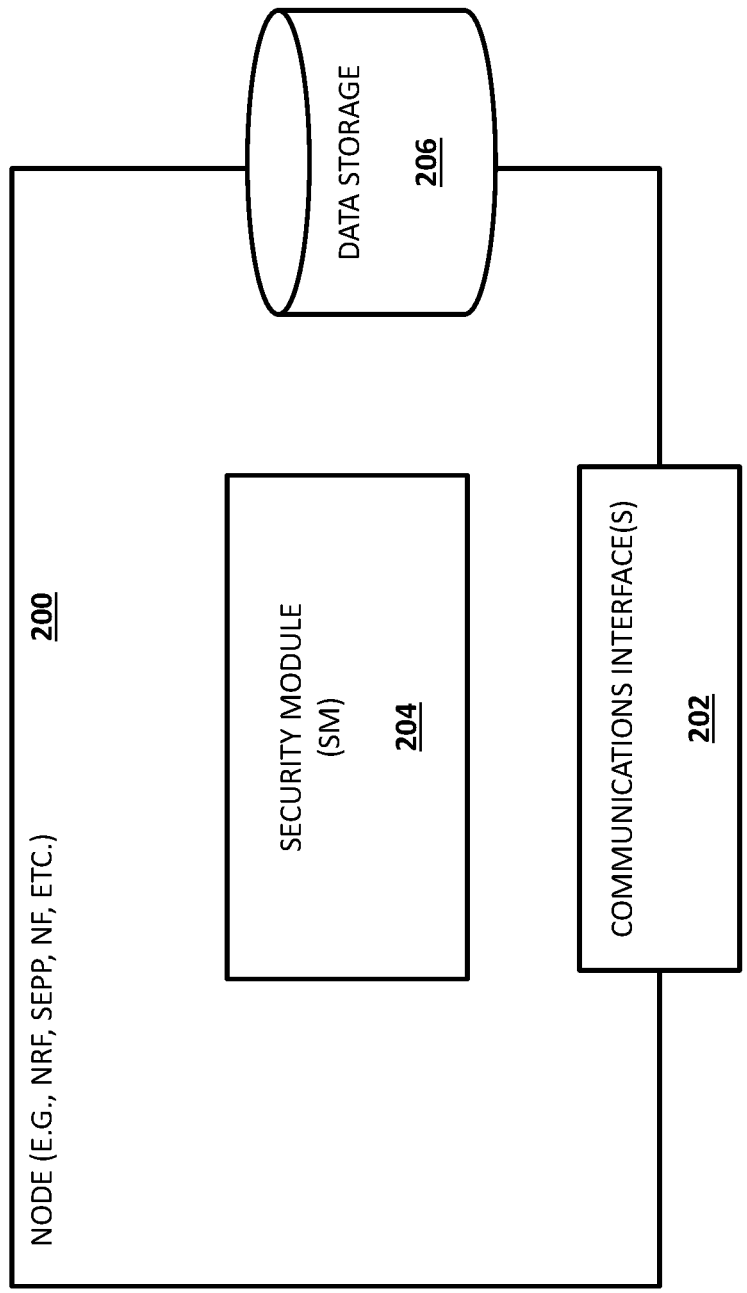
FIG. 2 is a diagram illustrating an example network node for hiding network function (NF) instance identifiers (IDs) in a 5G communications network.

FIG. 2 is a diagram illustrating an example network node 200 for hiding NF instance IDs in a 5G communications network. Node 200 may represent any suitable entity or entities for performing various aspects of authorization, registration, and/or security functions, e.g., hiding NF instance IDs and/or related topology information. In some embodiments, node 200 may represent or include one or more 5GC NFs, e.g., an NRF, a SEPP, a SCP, a PCF, an NSSF, an NEF, a unified data repository (UDR), a binding support function (BSF), etc. In some embodiments, node 200 may represent or include a consumer NF or a producer NF. In some embodiments, node 200 may represent or include an authorization server, a data repository, a network gateway, a network proxy, an edge security device, or other functionality.

In some embodiments, node 200 or a related module (e.g., a security module) may be configured (e.g., via programming logic) to detect, generate, obtain, or assign pseudo NF instance IDs during an NF registration procedure. For example, where node 200 includes an NRF, node 200 or a related module may receive a 5G NF registration request message for registering a first NF instance, wherein the 5G NF registration request message comprises a first NF instance ID. In this example, node 200 or a related module may determine one or more pseudo NF instance IDs associated with the first NF instance ID, wherein each of the one or more pseudo NF instance IDs is usable for referring to the first NF instance in lieu of the first NF instance ID. Continuing with this example, node 200 or a related module may generate and send a 5G NF registration response message comprising the one or more pseudo NF instance IDs.

In some embodiments, node 200 or a related module (e.g., a security module) may be configured to use pseudo NF instance IDs for various communication scenarios. For example, where node 200 includes an NF instance that has registered with an NRF 100 and has received from NRF 100 a set of assigned pseudo NF instance IDs in a 5G NF registration response message, node 200 or a related module (e.g., a security module) may be configured to use a pseudo NF instance ID for identification in various 5G request messages (except NF registration, NF update, and NF deregistration request messages) and to respond to various 5G messages that are directed to one of the pseudo NF instance IDs associated with node 200.

Referring to FIG. 2, node 200 may include one or more communications interface(s) 202 for communicating messages via a communications environment, e.g., a home 5GC network. For example, communications interface(s) 202 may include a first communication interface for communicating with a first set of SEPPs 126 in a home network, a second communications interface for communicating with a second set of SEPPs 126 in a home network, and a third communications interface for communicating with other entities in a home network.

Node 200 may include a security module (SM) 204. SM 204 may be any suitable entity (e.g., software executing on at least one processor) for performing one or more aspects associated with using and/or validating pseudo NF instance IDs. In some embodiments, SM 204 may be configured for receiving a 5G NF registration request message for registering a first NF instance, wherein the 5G NF registration request message comprises a first NF instance ID and generating and sending a 5G NF registration response message comprising one or more pseudo NF instance IDs associated with the first NF instance ID, wherein each of the one or more pseudo NF instance IDs is usable for referring to the first NF instance in lieu of the first NF instance ID.

In some embodiments, SM 204 may be configured to use pseudo NF instance IDs for various communication scenarios. For example, SM 204 may be configured for analyzing one or more 5G messages that are to be sent and replacing an NF instance ID with a corresponding pseudo NF instance ID prior to sending when appropriate, e.g., performing replacements except for NF registration, NF update, and NF deregistration request messages. In this example, SM 204 may also be configured for verifying that pseudo NF instance IDs are valid or appropriate for various received 5G messages.

In some embodiments, SM 204 may be configured for accessing or utilizing a data store containing one or more associations between an NF instance IDs and pseudo NF instance IDs. For example, SM 204 may be configured for receiving, from a consumer NF instance, a service request message for discovering the first NF instance; determining, using a data store storing associations between NF instance IDs and related pseudo NF instance IDs, a first pseudo NF instance ID of the one or more pseudo NF instance IDs associated with the first NF instance ID; and sending, to the consumer NF instance, the first pseudo NF instance ID.

In some embodiments, SM 204 may be configured for message validation. For example, SM 204 may be configured for receiving a request message for performing an action associated with a first NF instance, wherein the request message comprises an ID for the first NF instance; determining, using the ID and a data store storing associations between NF instance IDs and related pseudo NF instance IDs, that the request message is valid or invalid. In this example, if the request message is deemed invalid, SM 204 may be configured for performing an invalid message action (e.g., discarding the request message or notifying a network operator or a management system about the issue). Continuing with this example, if the request message is deemed valid, SM 204 may be configured for performing a valid message action (e.g., processing the request message or forwarding the request message to another node for processing).

In some embodiments, SM 204 may determine that a request message is invalid by analyzing a message type of a received message and determining that the message type cannot use a pseudo NF instance ID. For example, SM 204 may determine that an NF registration request message, an NF update request message, or an NF deregistration request message comprising a pseudo NF instance ID is invalid or improper and may discard or otherwise ignore the request message.

In some embodiments, e.g., where node 200 is SEPP 126, SM 204 may be configured for monitoring an N32-f interface connection for inter-PLMN messages (e.g., HTTP/2 messages) and for validating the messages before being sent to another destination. For example, for a first inter-PLMN 5G NF deregistration message, SM 204 may determine that the request message is valid (e.g., that the message includes an actual or non-pseudo NF instance ID) and send it to NRF 100 for processing. In another example, for a second inter-PLMN 5G NF deregistration message, SM 204 may determine that the request message is invalid (e.g., that the message includes a pseudo NF instance ID) and discard or prevent the request message from being received by NRF 100.

Node 200 may access (e.g., read from and/or write information to) data storage 206. Data storage 206 may be any suitable entity (e.g., a computer readable medium or memory) for storing various data. In some embodiments, data storage 206 may include authentication information for user devices and/or related information used in hiding NF instance IDs or related message validation. For example, data store 206 may include data records or entries indicating associations between NF instance IDs and pseudo NF instance IDs. In some embodiments, data storage 206 may include logic for obtaining, generating, or assigning pseudo NF instance IDs to NF instances, logic for obtaining NF instance identification information from various inter-PLMN messages, logic for performing message validation using stored authentication information, and/or logic for implementing or triggering an invalid message action or valid message action.

It will be appreciated that FIG. 2 and its related description are for illustrative purposes and that node 200 may include additional and/or different modules, components, or functionality.

Figure 3:
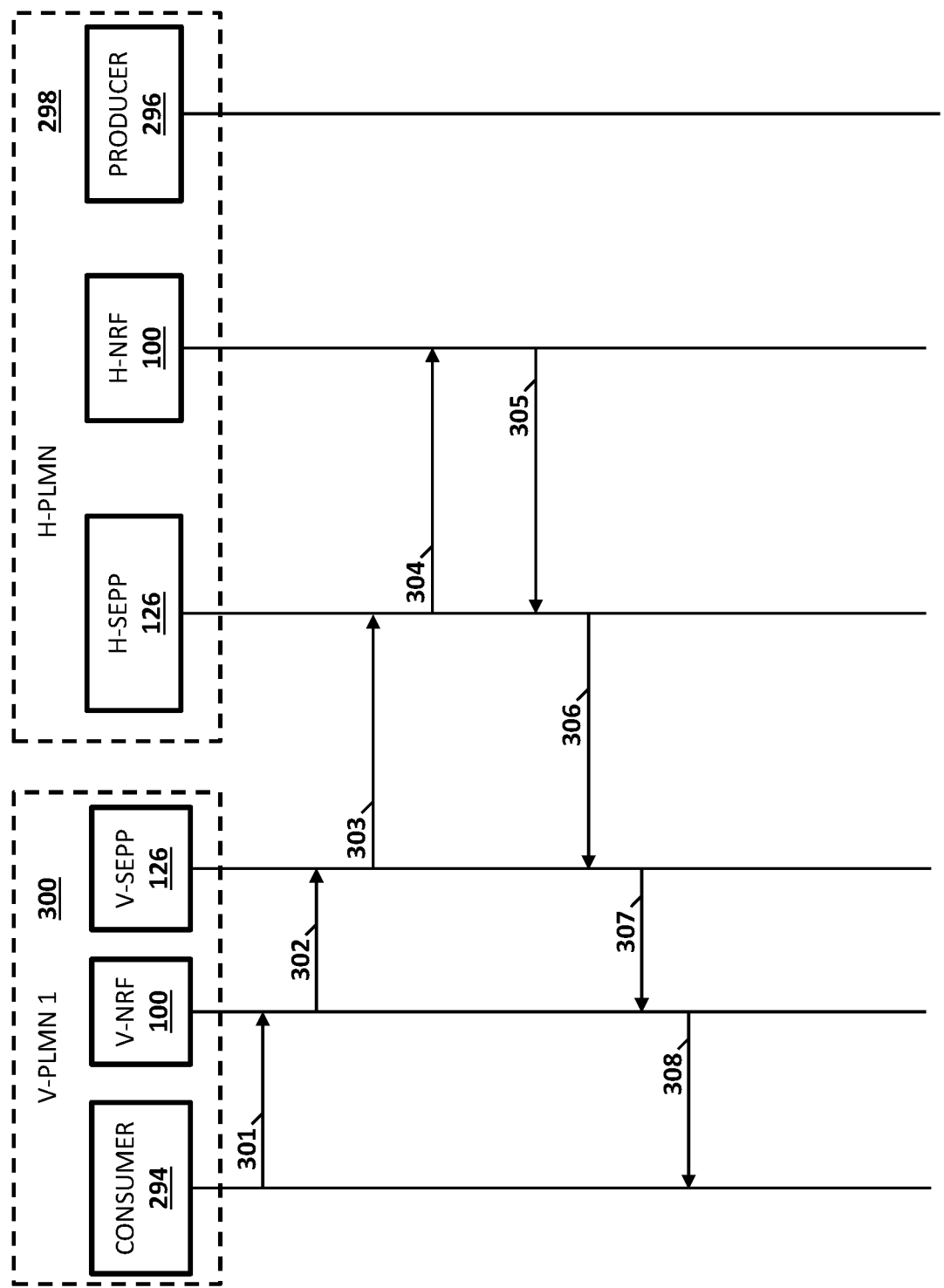
FIG. 3 is a message flow diagram illustrating an example NF discovery scenario involving an NF instance ID.

FIG. 3 is a message flow diagram illustrating an example NF discovery scenario involving an NF instance ID. In some embodiments, H-NRF 100 (without SM 204) may receive an NF discovery request message requesting an NF for providing a particular service or information and may provide an NF discovery response comprising an NF instance ID for identifying a particular NF instance, e.g., where the NF instance ID is a unique identifier. In such embodiments, foreign NF discovery requesters (e.g., in V-PLMN 1 300) may receive actual (e.g., non-pseudo) NF instance IDs for communicating with various NF instances in a home network (e.g., H-PLMN 298) and, as such, nodes in V-PLMN 300 may learn or know actual NF instance IDs for those NF instances.

Referring to FIG. 3, e.g., prior to step 301, an NF registration procedure for registering producer NF 296 (e.g., a particular NF instance) may occur. During or concurrent to the NF registration procedure, H-NRF 100 may store an NF instance ID associated with and provided by producer NF 296. For example, the NF instance ID associated with producer NF 296 may be globally unique inside the PLMN (e.g., H-PLMN 298) of H-NRF 100 where producer NF 296 is being registered. In this example, the NF instance ID may be usable for identifying, referring to, and/or communicating with producer NF 296.

In step 301, an NF discovery request message may be sent from consumer NF 294 to V-NRF 100 in V-PLMN 1 300 for requesting NF instance that can provide a particular service or related information from H-PLMN 298.

In step 302, the NF discovery request message may be sent from V-NRF 100 to V-SEPP 126 for forwarding to H-NRF 100 in H-PLMN 298.

In step 303, the NF discovery request message (e.g., as an HTTP/2 message) may be forwarded from V-SEPP 126 to H-SEPP 126 via an N32-f interface.

In step 304, the NF discovery request message may be sent from H-SEPP 126 to H-NRF 100. For example, H-NRF 100 receive the NF discovery request message and select an appropriate NF instance, i.e., producer NF 296, for providing the service or information.

In step 305, an NF discovery response comprising or indicating the NF instance ID identifying producer NF 296 may be generated and sent from H-NRF 100 to H-SEPP 126 for forwarding to V-PLMN 300.

In step 306, the NF discovery response (e.g., as an HTTP/2 message) may be forwarded from H-SEPP 126 to V-SEPP 126 via an N32-f interface.

In step 307, the NF discovery response may be sent from V-SEPP 126 to V-NRF 100.

In step 308, the NF discovery response may be sent from V-NRF 100 to consumer NF 294.

In some embodiments, consumer NF 294 may use the NF instance ID to request service or related data from producer 296, e.g., via an SBI request message.

It will be appreciated that FIG. 3 is for illustrative purposes and that different and/or additional messages and/or actions may be used. It will also be appreciated that various messages and/or actions described herein may occur in a different order or sequence.

Figure 4:
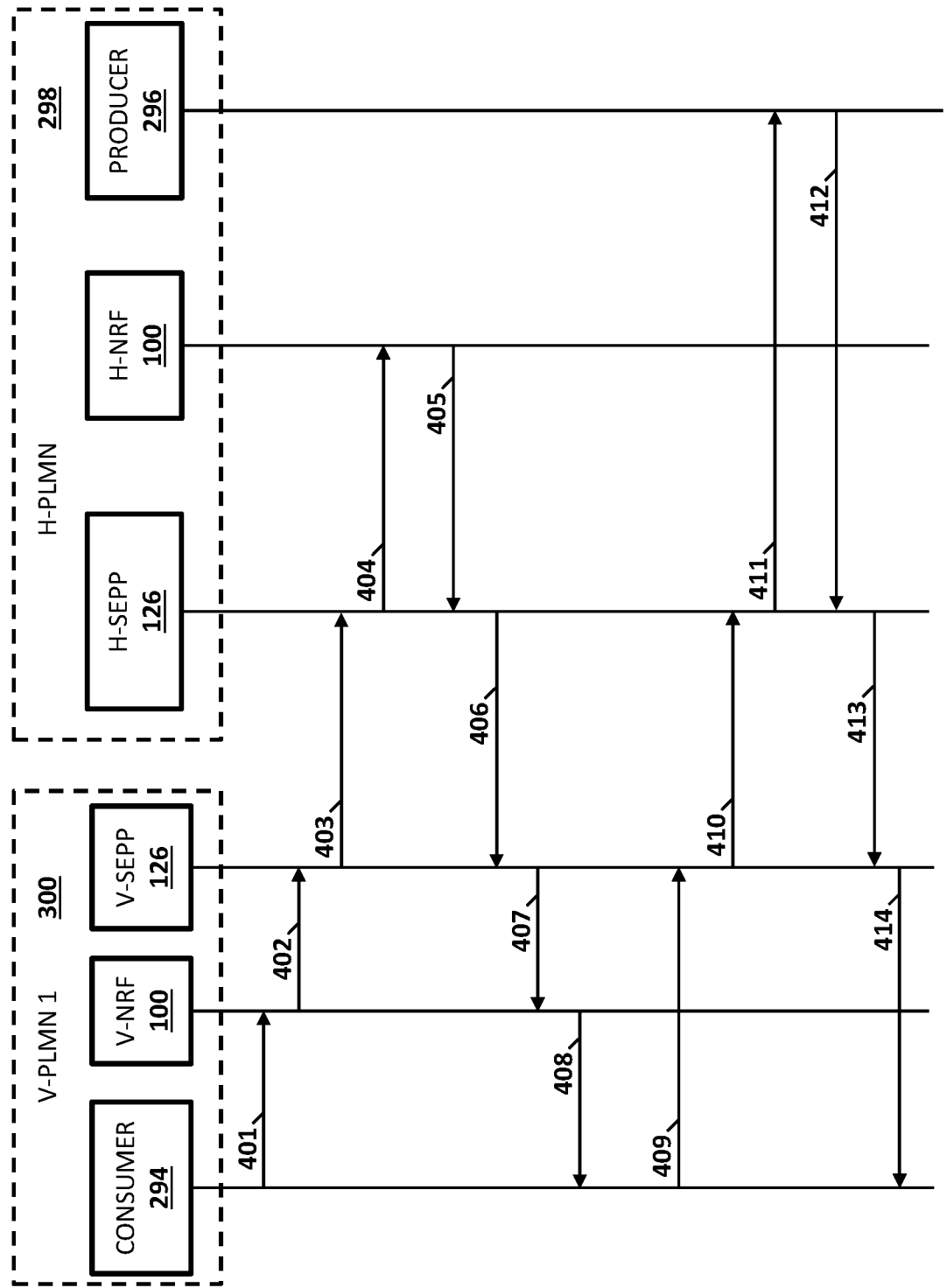
FIG. 4 is a message flow diagram illustrating usage of an example NF access token comprising an NF instance ID.

FIG. 4 is a message flow diagram illustrating usage of an example NF access token comprising an NF instance ID. In some embodiments, H-NRF 100 (without SM 204) may provide an access token comprising an NF instance ID for identifying a particular NF instance, e.g., where the NF instance ID is a unique identifier. In such embodiments, foreign access token requesters (e.g., in V-PLMN 1 300) may receive actual (e.g., non-pseudo) NF instance IDs for communicating with various NF instances in a home network (e.g., H-PLMN 298) and, as such, nodes in V-PLMN 300 may learn or know actual NF instance IDs for those NF instances.

Referring to FIG. 4, e.g., prior to step 401, an NF registration procedure for registering producer NF 296 (e.g., a particular NF instance) may occur. During or concurrent to the NF registration procedure, H-NRF 100 may store an NF instance ID associated with and provided by producer NF 296. For example, the NF instance ID associated with producer NF 296 may be globally unique inside the PLMN (e.g., H-PLMN 298) of H-NRF 100 where producer NF 296 is being registered. In this example, the NF instance ID may be usable for identifying, referring to, and/or communicating with producer NF 296.

In step 401, an access token request message may be sent from consumer NF 294 to V-NRF 100 in V-PLMN 1 300 for accessing a service or related information from H-PLMN 298. For example, consumer NF 294 in a V-PLMN 1 300 may represent a network node requesting an access token (e.g., an OAuth2 access token) so as to receive a service or related information in a home network, e.g., from producer NF 296.

In step 402, the access token request message may be sent from V-NRF 100 to V-SEPP 126 for forwarding to H-NRF 100 in H-PLMN 298.

In step 403, the access token request message (e.g., as an HTTP/2 message) may be forwarded from V-SEPP 126 to H-SEPP 126 via an N32-f interface.

In step 404, the access token request message may be sent from H-SEPP 126 to H-NRF 100. For example, H-NRF 100 may receive the access token request message and select an appropriate NF instance, i.e., producer NF 296, for providing the service or information.

In step 405, H-NRF 100 may generate an access token comprising or indicating the NF instance ID for identifying producer NF 296 and may send the access token in an access token response from H-NRF 100 to H-SEPP 126 for forwarding to V-PLMN 300.

In step 406, the access token response (e.g., as an HTTP/2 message) may be forwarded from H-SEPP 126 to V-SEPP 126 via an N32-f interface.

In step 407, the access token response may be sent from V-SEPP 126 to V-NRF 100.

In step 408, the access token response may be sent from V-NRF 100 to consumer NF 294.

In step 409, an SBI request message comprising the access token may be sent from consumer NF 294 to V-SEPP 126 for forwarding to H-PLMN 298.

In step 410, the SBI request message (e.g., as an HTTP/2 message) may be forwarded from V-SEPP 126 to H-SEPP 126 via an N32-f interface.

In step 411, the SBI request message may be sent from H-SEPP 126 to producer NF 296.

In step 412, e.g., after validating the access token, an SBI response providing a requested service or information may be generated and sent from producer NF 296 to H-SEPP 126 for forwarding to V-PLMN 300.

In step 413, the SBI response (e.g., as an HTTP/2 message) may be forwarded from H-SEPP 126 to V-SEPP 126 via an N32-f interface.

In step 414, the SBI response may be sent from V-SEPP 126 to consumer NF 294.

It will be appreciated that FIG. 4 is for illustrative purposes and that different and/or additional messages and/or actions may be used. It will also be appreciated that various messages and/or actions described herein may occur in a different order or sequence.

FIG. 5 is a diagram illustrating example ID data 500 indicating NF instance IDs and related pseudo NF instance IDs. For example, ID data 500 may indicate mappings (e.g., associations) between an NF instance ID and one or more pseudo NF instance IDs. In some embodiments, an ID mapping or association may be statically configured by an operator or may be dynamically generated by NRF 100 and may be shared with an NF. For example, during an NF registration procedure associated with an NF, pseudo NF instance IDs assigned to the NF may be shared in an NF registration response sent to the NF.

In some embodiments, node 200, H-NRF 100, or SM 204 may be configured to assign pseudo NF instance IDs based on various rules and/or logic. For example, H-NRF 100 may be configured to assign at least one unique pseudo NF instance ID to NFs that register with H-NRF 100. In another example, H-NRF 100 may be configured to assign a set of between 3 and 6 unique pseudo NF instance IDs to NFs that register with H-NRF 100. In some embodiments, each pseudo NF instance ID associated with or assigned to a particular NF instance may be non-sequential and/or generated or assigned for reducing the likelihood that a corresponding actual (non-pseudo) NF instance ID can be deduced or discerned.

In some embodiments, an NF (e.g., producer NF 296) may store its own pseudo NF instance IDs and may use and/or provide one of those pseudo NF instance IDs for identification in lieu of using its actual NF instance ID. For example, when an NF is sending a 5GC request message, the NF may use one of its pseudo NF instance IDs for identifying itself instead of its actual NF instance ID. In this example, the NF may utilize a selection algorithm (e.g., round-robin, pseudo-random, request-type, or time-based) for selecting a particular pseudo NF instance ID from its set of pseudo NF instance IDs. Continuing with this example, the NF may utilize the same pseudo NF instance ID for transactions with the same node or network, e.g., by storing state information and/or using a hashing function.

Referring to FIG. 5, a table representing ID data 500 comprises columns and/or fields for NF instance IDs and corresponding pseudo NF instance IDs. An NF instance ID field may store information for representing an NF instance ID usable for identifying a particular NF instance. In some embodiments, each NF instance ID may be globally unique inside the PLMN (e.g., H-PLMN 298) of H-NRF 100 where a corresponding NF instance is registered. In some embodiments, the format of an NF instance ID may be a universally unique identifier (UUID) version 4, as described in IETF RFC 4122. For example, an NF instance ID 'ID1' may represent a 128-bit UUID where 16 bytes (e.g., octets) of the UUID are represented as 32 hexadecimal digits, and where the digits are displayed in five groups separated by hyphens, in the form 8-4-4-4-12 for a total of 36 characters (32 hexadecimal characters and 4 hyphens), e.g., "4947a69a-f61b-4bc1-b9da-47c9c5d14b64".

A pseudo NF instance IDs field may represent one or more pseudo NF instance IDs assigned to and/or associated with a corresponding NF instance ID. In some embodiments, e.g., similar to an actual NF instance ID, each pseudo NF instance ID may be globally unique inside the PLMN (e.g., H-PLMN 298) of H-NRF 100 where a corresponding NF instance is registered, but may be temporary (e.g., assigned to same NF instance for a valid period or while registered) and may be re-assigned to another NF instance later (e.g., after an NF deregistration procedure). In some embodiments, the format of a pseudo NF instance ID may be the same as an actual NF instance ID, e.g., a UUID version 4 format. For example, pseudo instance ID 'PID2' may represent a 128-bit UUID such as "5162f79a-c31b-4bc1-c8da-27e5c5d34b22".

As depicted, the first row in FIG. 5 indicates an association between NF instance ID 'ID1' and pseudo NF instance IDs "PID2", "PID4", and "PID7"; the second row in FIG. 5 indicates an association between NF instance ID 'ID2' and pseudo NF instance IDs "PID61", "PID40", "PID55", "PID32", and "PID34"; the third row in FIG. 5 indicates an association between NF instance ID 'ID3' and pseudo NF instance IDs "PID27", "PID21", and "PID25"; the fourth row in FIG. 5 indicates an association between NF instance ID 'ID4' and pseudo NF instance IDs "PID72", "PID29", "PID33", and "PID11"; the fifth row in FIG. 5 indicates an association between NF instance ID 'ID5' and pseudo NF instance IDs "PID16", "PID22", "PID64", and "PID96".

It will also be appreciated that ID data 500 is for illustrative purposes and that different and/or additional data than the data depicted in FIG. 5 may be usable for indicating default values for particular data portions or other information. Further, ID data 500 may be stored (e.g., in data storage 206) and managed using various data structures and/or computer readable media.

FIG. 6 is a diagram illustrating example ID usage data 600 indicating message types and related pseudo NF instance ID usage. ID usage data 600 may indicate various types of messages (e.g., inter-PLMN messages) associated with 5G services and whether a pseudo NF instance ID can be used for validation purposes. For example, when UE 114 is roaming in V-PLMN 1 300, various communications between V-PLMN 1 300 and H-PLMN 298 that involve multiple NF instances may occur. In this example, inter-PLMN messages may be sent between V-PLMN 1 300 and H-PLMN 298 via SEPPs 126 in the respective networks. While some messages can successfully utilize pseudo NF instance IDs, other messages (e.g., NF registration, NF update, and NF deregistration request messages) may require actual NF instance IDs to be successfully validated and processed. For example, H-NRF 100 may discard or ignore any NF registration, NF update, and NF deregistration request messages that have pseudo NF instance identifiers, thereby reducing the chance of a malicious or hacked foreign node trying to deregister a network node.

In some embodiments, e.g., during message validation, node 200, H-NRF 100, or SM 204 may be configured to identify a message type of a received message (e.g., inter-PLMN message) and determine, using ID usage data 600, whether an actual NF instance ID is included in the received message and, if not, whether a pseudo NF instance ID in the received message is acceptable or allowed. For example, node 200 or SM 204 may deem an NF subscription request message as valid if the NF subscription request message includes a pseudo NF instance ID identifying producer NF 296, but may deem an NF update request message as invalid (or improper) if it includes the same pseudo NF instance ID but not the actual NF instance ID associated with producer NF 296.

Referring to FIG. 6, a table representing ID usage data 600 comprises columns and/or fields for message type and pseudo NF instance ID usage (e.g., indicating whether pseudo NF instance IDs are usable or allowed for a corresponding message type). A message type field may store information for representing a type of message associated with NF instances. For example, example message types depicted in FIG. 6 include NF registration messages, NF update messages, NF deregistration messages, NF discovery messages, NF profile messages, NF access token messages, and SBI messages.

A pseudo NF instance ID usage field may indicate whether pseudo NF instance IDs are usable or allowed for a corresponding message type. For example, as depicted in FIG. 6, valid NF registration messages, NF update messages, and NF deregistration messages do not allow pseudo NF instance IDs; but valid NF discovery messages, NF profile messages, NF access token messages, and SBI messages do allow pseudo NF instance IDs.

It will also be appreciated that ID usage data 600 is for illustrative purposes and that different and/or additional data than the data depicted in FIG. 6 may be usable for indicating default values for particular data portions or other information. Further, ID usage data 600 may be stored (e.g., in data storage 206) and managed using various data structures and/or computer readable media.

Figure 7:
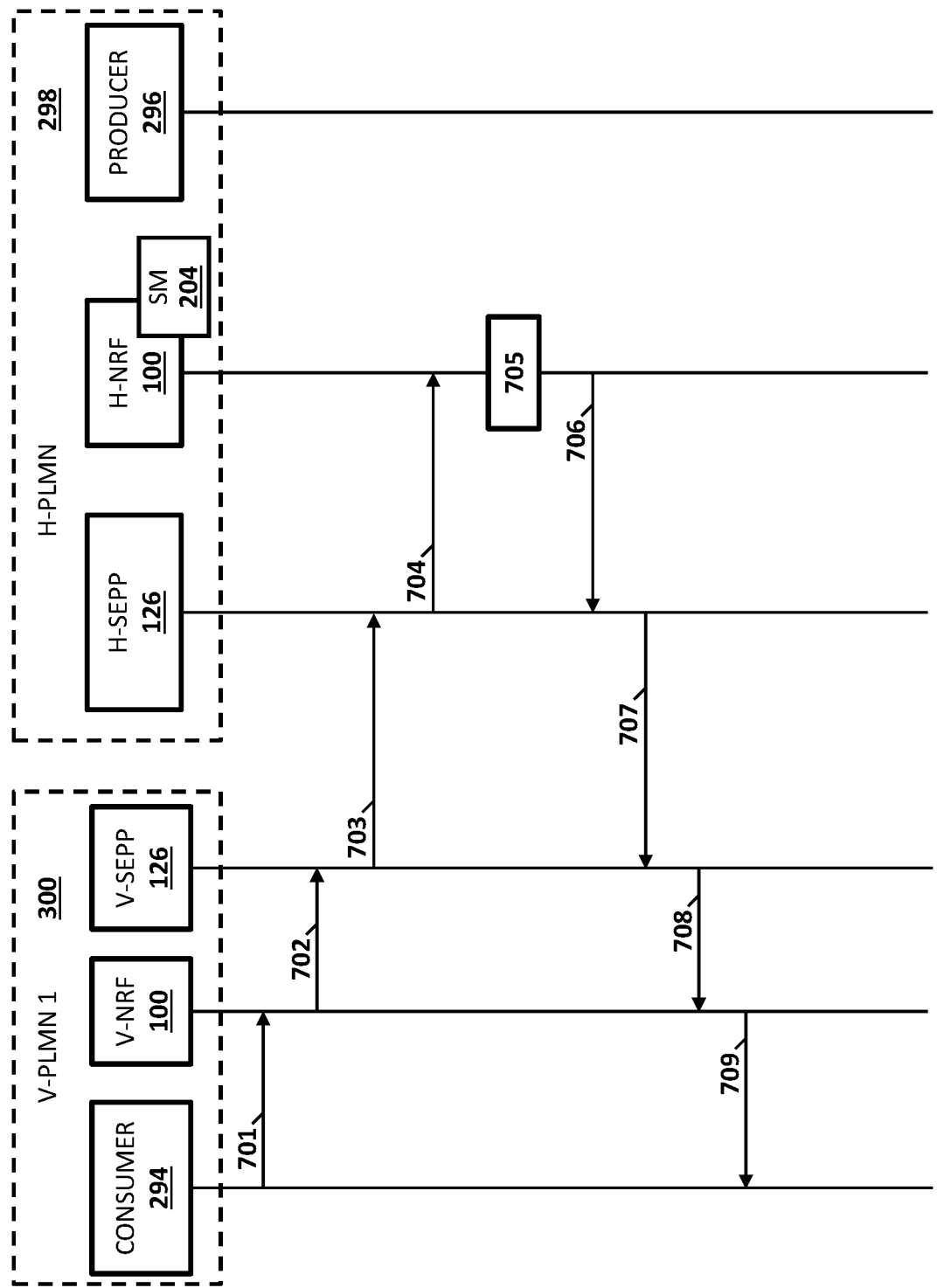
FIG. 7 is a message flow diagram illustrating an example NF discovery scenario involving a pseudo NF instance ID.

FIG. 7 is a message flow diagram illustrating an example NF discovery scenario involving an NF instance ID. In some embodiments, H-NRF 100 or SM 204 therein may receive an NF discovery request message requesting an NF for providing a particular service or information and may provide an NF discovery response comprising a pseudo NF instance ID for identifying a particular NF instance, e.g., where the pseudo NF instance ID is one of multiple temporary instance IDs assigned during an NF registration procedure or predetermined by a network operator. In such embodiments, foreign NF discovery requesters (e.g., in V-PLMN 1 300) may receive pseudo NF instance IDs for communicating with various NF instances in a home network (e.g., H-PLMN 298) and, as such, nodes in V-PLMN 300 will not learn or know actual NF instance IDs for those NF instances.

Referring to FIG. 7, e.g., prior to step 701, an NF registration procedure for registering producer NF 296 (e.g., a particular NF instance) may occur. During or concurrent to the NF registration procedure, one or more pseudo NF instance IDs corresponding to producer NF 296 may be assigned and/or stored for use by one or more entities, e.g., H-NRF 100. For example, producer NF 296 may register with H-NRF 100 using an NF instance ID 'ID45' and may receive, from H-NRF 100, a set of pseudo NF instance IDs, e.g., 'PID23', 'PID44', and 'PID55'. In this example, the set of pseudo NF instance IDs may be uniquely assigned to producer NF 296 for a predetermined amount of time or while producer NF 296 is registered with the home network.

In step 701, an NF discovery request message may be sent from consumer NF 294 to V-NRF 100 in V-PLMN 1 300 for requesting NF instance that can provide a particular service or related information from H-PLMN 298.

In step 702, the NF discovery request message may be sent from V-NRF 100 to V-SEPP 126 for forwarding to H-NRF 100 in H-PLMN 298.

In step 703, the NF discovery request message (e.g., as an HTTP/2 message) may be forwarded from V-SEPP 126 to H-SEPP 126 via an N32-f interface.

In step 704, the NF discovery request message may be sent from H-SEPP 126 to H-NRF 100.

In step 705, H-NRF 100 or SM 204 therein may receive the NF discovery request message, determine or select an appropriate NF instance, i.e., producer NF 296, for providing the service or information; and identify a corresponding pseudo NF instance ID for identifying producer NF 296.

In step 706, an NF discovery response comprising or indicating the pseudo NF instance ID identifying producer NF 296 may be sent from H-NRF 100 to H-SEPP 126 for forwarding to V-PLMN 300.

In step 707, the NF discovery response (e.g., as an HTTP/2 message) may be forwarded from H-SEPP 126 to V-SEPP 126 via an N32-f interface.

In step 708, the NF discovery response may be sent from V-SEPP 126 to V-NRF 100.

In step 709, the NF discovery response may be sent from V-NRF 100 to consumer NF 294.

In some embodiments, consumer NF 294 may use the pseudo NF instance ID to request service or related data from producer 296, e.g., via an SBI request message.

It will be appreciated that FIG. 7 is for illustrative purposes and that different and/or additional messages and/or actions may be used. It will also be appreciated that various messages and/or actions described herein may occur in a different order or sequence.

Figure 8:
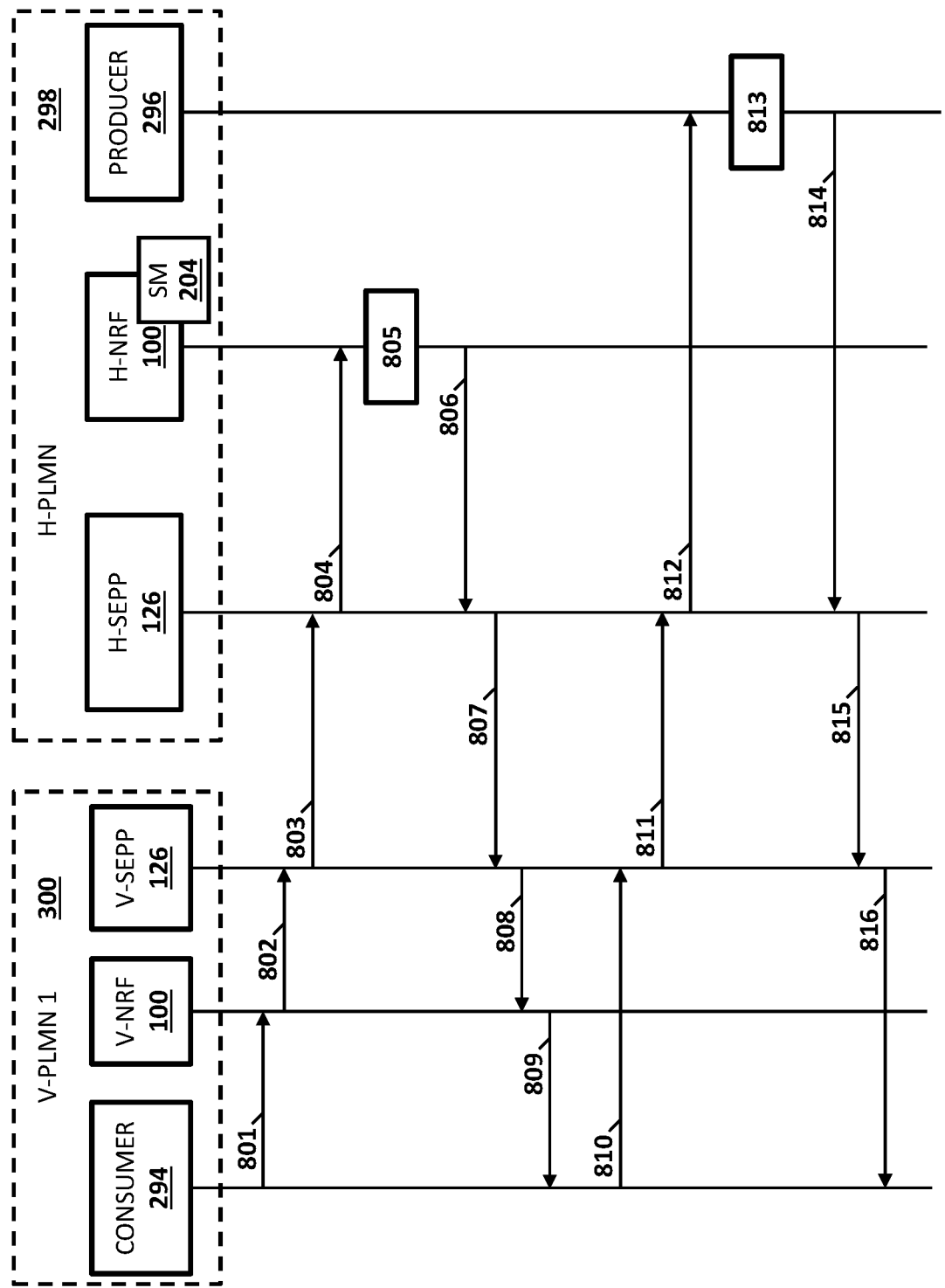
FIG. 8 is a message flow diagram illustrating usage of an example NF access token comprising a pseudo NF instance ID.

FIG. 8 is a message flow diagram illustrating usage of an example NF access token comprising a pseudo NF instance ID. In some embodiments, H-NRF 100 or SM 204 therein may be configured to provide an access token comprising a pseudo NF instance ID for identifying a particular NF instance, e.g., where the pseudo NF instance ID is one of multiple temporary instance IDs assigned during an NF registration procedure or predetermined by a network operator. In such embodiments, foreign NF discovery requesters (e.g., in V-PLMN 1 300) may receive pseudo NF instance IDs for communicating with various NF instances in a home network (e.g., H-PLMN 298) and, as such, nodes in V-PLMN 300 will not learn or know actual NF instance IDs for those NF instances.

Referring to FIG. 8, e.g., prior to step 801, an NF registration procedure for registering producer NF 296 (e.g., a particular NF instance) may occur. During or concurrent to the NF registration procedure, one or more pseudo NF instance IDs corresponding to producer NF 296 may be assigned and/or stored for use by one or more entities, e.g., H-NRF 100. For example, producer NF 296 may register with H-NRF 100 using an NF instance ID 'ID45' and may receive, from H-NRF 100, a set of pseudo NF instance IDs, e.g., 'ID23', 'PID44', and 'ID55'. In this example, the set of pseudo NF instance IDs may be uniquely assigned to producer NF 296 for a predetermined amount of time or while producer NF 296 is registered with the home network.

In step 801, an access token request message may be sent from consumer NF 294 to V-NRF 100 in V-PLMN 1 300 for accessing a service or related information from H-PLMN 298. For example, consumer NF 294 in a V-PLMN 1 300 may represent a network node requesting an access token (e.g., an OAuth2 access token) so as to receive a service or related information in a home network, e.g., from producer NF 296.

In step 802, the access token request message may be sent from V-NRF 100 to V-SEPP 126 for forwarding to H-NRF 100 in H-PLMN 298.

In step 803, the access token request message (e.g., as an HTTP/2 message) may be forwarded from V-SEPP 126 to H-SEPP 126 via an N32-f interface.

In step 804, the access token request message may be sent from H-SEPP 126 to H-NRF 100.

In step 805, H-NRF 100 or SM 204 therein may receive the access token request message, select an appropriate NF instance (e.g., producer NF 296) for providing the service or information, and generate an access token comprising or indicating a pseudo NF instance ID for identifying the selected NF instance.

In step 806, an access token response comprising the access token may be generated and sent from H-NRF 100 to H-SEPP 126 for forwarding to V-PLMN 300.

In step 807, the access token response (e.g., as an HTTP/2 message) may be forwarded from H-SEPP 126 to V-SEPP 126 via an N32-f interface.

In step 808, the access token response may be sent from V-SEPP 126 to V-NRF 100.

In step 809, the access token response may be sent from V-NRF 100 to consumer NF 294.

In step 810, an SBI request message comprising the access token may be sent from consumer NF 294 to V-SEPP 126 for forwarding to H-PLMN 298.

In step 811, the SBI request message (e.g., as an HTTP/2 message) may be forwarded from V-SEPP 126 to H-SEPP 126 via an N32-f interface.

In step 812, the SBI request message may be sent from H-SEPP 126 to producer NF 296.

In step 813, producer NF 296 may use the pseudo NF instance ID obtained from the access token in the received SBI request message for validation purposes. For example, producer NF 296 may store a set of pseudo NF instance IDs assigned to itself, e.g., by H-NRF 100 during an NF registration procedure. In this example, producer NF 296 may confirm that the received pseudo NF instance ID matches a pseudo NF instance ID in the set of pseudo NF instance IDs.

In step 814, e.g., after validating the access token, an SBI response providing a requested service or information may be generated and sent from producer NF 296 to H-SEPP 126 for forwarding to V-PLMN 300.

In step 815, the SBI response (e.g., as an HTTP/2 message) may be forwarded from H-SEPP 126 to V-SEPP 126 via an N32-f interface.

In step 816, the SBI response may be sent from V-SEPP 126 to consumer NF 294.

It will be appreciated that FIG. 8 is for illustrative purposes and that different and/or additional messages and/or actions may be used. It will also be appreciated that various messages and/or actions described herein may occur in a different order or sequence.

Figure 9:
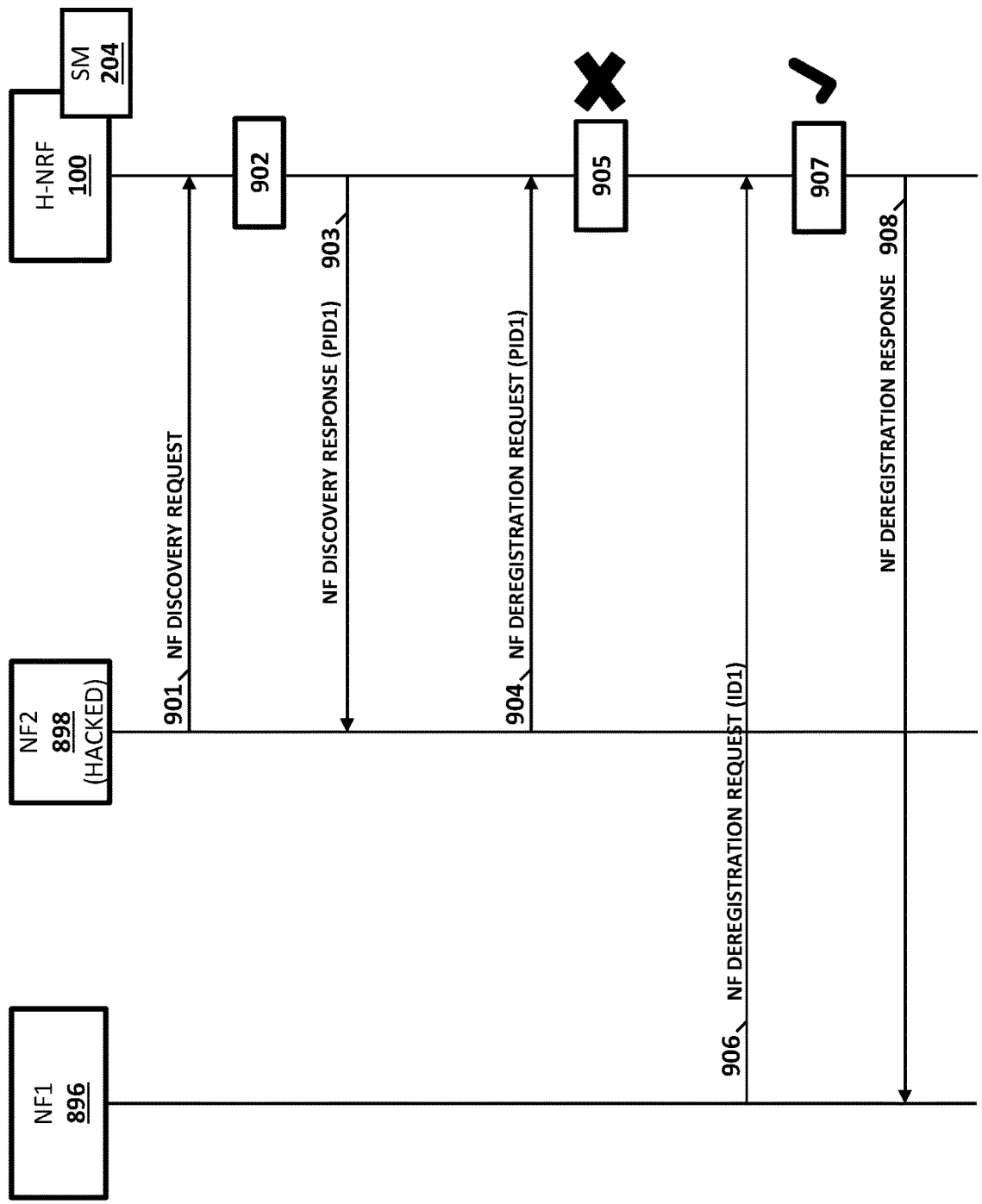
FIG. 9 is a message flow diagram illustrating example validation of NF deregistration request messages.

FIG. 9 is a message flow diagram illustrating example validation of NF deregistration request messages. In some embodiments, H-NRF 100 or SM 204 therein may be configured to perform message validation using an NF instance ID or a pseudo NF instance ID. For example, after storing ID data (e.g., an NF instance ID and corresponding pseudo NF instance IDs) associated with a first NF instance (NF1) 896 during a registration procedure for NF1 896, H-NRF 100 or SM 204 therein may monitor ingress messages (e.g., e.g., inter-PLMN and/or HTTP/2 messages) associated with NF instances and may determine whether each of these ingress messages are valid using the stored ID data before processing, forwarding, and/or responding to the ingress message. If H-NRF 100 or SM 204 determines that the NF instance ID or pseudo NF instance ID in the message does not match the relevant stored ID data or is not appropriate for the type of message, then H-NRF 100 or SM 204 may deem the message invalid and perform an invalid message action, e.g., discarding one or more of the inter-PLMN and/or report the event to a network operator or a network management system. If H-NRF 100 or SM 204 determines that the NF instance ID or pseudo NF instance ID in the message matches the relevant stored ID data and is appropriate for the type of message, then H-NRF 100 or SM 204 therein may deem the message valid and perform a valid message action, e.g., allowing the ingress message to be received at an intended destination and processed.

Referring to FIG. 9, e.g., prior to step 901, an NF registration procedure for registering NF1 896 may occur. During or concurrent to the NF registration procedure, one or more pseudo NF instance IDs corresponding to NF1 896 may be assigned and/or stored for use by one or more entities, e.g., H-NRF 100. For example, NF1 896 may register with H-NRF 100 using an NF instance ID 'ID1' and may receive, from H-NRF 100, a set of pseudo NF instance IDs, e.g., 'PID1', and 'PID3'. In this example, the set of pseudo NF instance IDs may be uniquely assigned to NF1 896 for a predetermined amount of time or while NF1 896 is registered with the home network.

In some embodiments, after NF1 896 has registered with H-NRF 100, a consumer NF instance (NF2) 898 may request an NF profile or related information (e.g., an NF instance ID) associated with a particular service or NF and attempt to misuse the information. For example, NF2 898 may be or appear to be a 5G NF instance located in a V-PLMN 1 300. In this example, NF2 898 may be compromised, hacked, or otherwise configured to perform or attempt to perform malicious or improper actions, such as initiate DoS attacks using learned NF instance IDs or pseudo NF instance IDs.

In step 901, an NF discovery request message for discovering an NF instance to provide service or data may be sent from NF2 898 to H-NRF 100, e.g., via V-SEPP 126 and H-SEPP 126 (not shown).

In step 902, after receiving the NF discovery request message, H-NRF 100 and/or SM 204 may identify a relevant NF instance (e.g., NF1 896) for providing the service or data and may determine a pseudo NF instance ID 'PID1' for communicating with and/or referring to that NF instance. In this example, H-NRF 100 and/or SM 204 may generate an NF discovery response that indicates the pseudo NF instance ID.

In step 903, an NF discovery response (e.g., as an HTTP/2 message) comprising a pseudo NF instance ID 'PID1' for communicating with and/or referring to NF1 896 may be sent from H-NRF 100 to NF2 898, e.g., via V-SEPP 126 and H-SEPP 126 (not shown).

In step 904, an NF deregistration request message for deregistering NF1 896 may be sent from NF2 898 to H-NRF 100 and may include the pseudo NF instance ID 'PID1'. For example, NF2 898 in a V-PLMN 1 300 may be compromised, hacked, or otherwise configured to try to deregister NF1 896. However, because NF2 898 does not know the actual NF instance ID (e.g., 'ID1') of NF1 896, NF2 898 uses the pseudo NF instance ID 'PID1' in its deregistration attempt of NF1 896.

In step 905, H-NRF 100 or SM 204 therein may receive the NF deregistration request message, perform a message validation procedure, determine that the NF deregistration request message is invalid, and perform an invalid message action, e.g., discard the NF deregistration request message. For example, H-NRF 100 or SM 204 may identify that the NF deregistration request message lacks an actual or non-pseudo NF instance ID, thereby indicating that the NF deregistration request message is improper or invalid (e.g., fraudulent) and should not be answered.

In step 906, a second NF deregistration request message for deregistering NF1 896 may be sent from NF1 896 to H-NRF 100 and may include its actual or non-pseudo NF instance ID 'ID1'.

In step 907, H-NRF 100 or SM 204 therein may receive the second NF deregistration request message, perform a message validation procedure, and determine that the second NF deregistration request message is valid, and perform an invalid message action. For example, H-NRF 100 or SM 204 may identify that the second NF deregistration request message include an actual or non-pseudo NF instance ID, thereby indicating that the NF deregistration request message is valid and should be answered.

In step 908, e.g., after determining that the second the NF deregistration request message is valid, H-NRF 100 or SM 204 may deregister NF1 896 and send an NF deregistration response to NF1 896 indicating that NF1 896 has been deregistered successfully.

It will be appreciated that FIG. 9 is for illustrative purposes and that different and/or additional messages and/or actions may be used. It will also be appreciated that various messages and/or actions described herein may occur in a different order or sequence.

Figure 10:
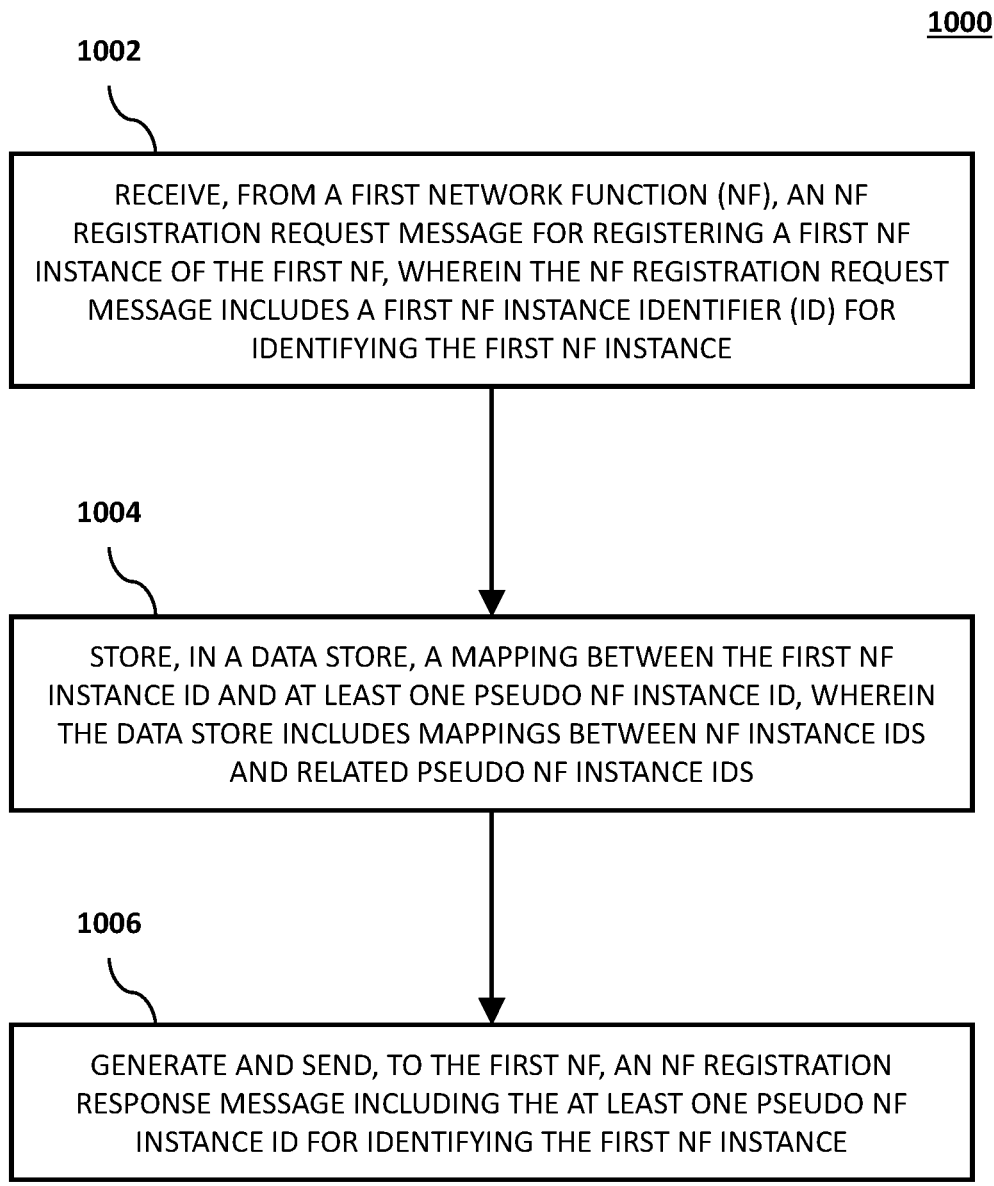
FIG. 10 is a flow chart illustrating an example process for hiding NF instance IDs in a communications network.

FIG. 10 is a diagram illustrating an example process 1000 for hiding NF instance IDs in a communications network. In some embodiments, example process 1000 described herein, or portions thereof, may be performed at or performed by a network node, e.g., NRF 100, node 200, SM 204, and/or another module, NF, or node.

In step 1002, an NF registration request message (e.g., a 5G NF registration request message) for registering a first NF instance of a first NF may be received, wherein the NF registration request message includes a first NF instance ID for identifying the first NF instance.

In step 1004, a mapping between the first NF instance ID and at least one pseudo NF instance ID may be stored, wherein the data store includes mappings between NF instance IDs and related pseudo NF instance IDs.

In step 1006, an NF registration response message (e.g., an 5G NF registration response message) including the at least one pseudo NF instance ID for identifying the first NF instance may be generated and sent.

In some embodiments, a first NF may be configured for receiving, from an NRF, an NF registration response message including at least one pseudo NF instance ID for identifying a first NF instance of the first NF, wherein each of the at least one pseudo NF instance ID is different from a first NF instance ID for identifying the first NF instance; storing the at least one pseudo NF instance ID associated with the first NF instance ID; and using a first pseudo NF instance ID of the at least one pseudo NF instance ID for sender identification when sending a request or response message.

In some embodiments, an NF (e.g., H-NRF 100) may be configured for receiving, from a consumer NF instance, a service request message for discovering a first NF instance; determining, using a data store storing associations between NF instance IDs and related pseudo NF instance IDs, a first pseudo NF instance ID of one or more pseudo NF instance IDs associated with the first NF instance ID; and sending, to the consumer NF instance, the first pseudo NF instance ID.

In some embodiments, a consumer NF instance may use a first pseudo NF instance ID to request an access token, an NF profile, or an NF subscription associated with the first NF instance.

In some embodiments, a consumer NF instance may use the first pseudo NF instance ID to communicate with the first NF instance via an SBI.

In some embodiments, a network node (e.g., H-NRF 100 or H-SEPP 126) may be configured for receiving a service request message for performing an action associated with a first NF instance, wherein the service request message comprises an ID for the first NF instance; determining, using the ID and a data store associations between NF instance IDs and related pseudo NF instance IDs, that the service request message is valid or invalid; in response to determining that the service request message is invalid, performing an invalid message action; and in response to determining that the service request message is valid, performing a valid message action.

In some embodiments, a network node for validating a request message using a pseudo NF instance ID in the request message may include an NRF, a producer NF, a PCR, a BSF, an SCP, an NSSF, an NEF, a UDR, or a 5GC NF.

In some embodiments, an invalid message action may include discarding a request message or notifying a network operator or a management system.

In some embodiments, a service request message may include an NF registration request message, an NF update request message, or an NF deregistration request message.

In some embodiments, determining that a request message (e.g., an NF registration request message, an NF update request message, or an NF deregistration request message) is invalid includes determining that an ID in the service request message is one of the one or more pseudo NF instance IDs associated with the first NF instance ID and that pseudo NF instance IDs are not allowed for that message or its message type.

It will be appreciated that process 1000 is for illustrative purposes and that different and/or additional actions may be used. It will also be appreciated that various actions described herein may occur in a different order or sequence.

It will be appreciated that while some aspects of the subject matter described herein has been discussed with reference to 5G networks various other networks may utilize some aspects of the subject matter described herein. For example, any network that utilizes NF instance IDs or similar IDs may use features, mechanisms and techniques described herein to assign or associate pseudo or temporary identifiers and use those pseudo or temporary IDs for various network interactions, e.g., inter-PLMN communications.

It will be appreciated that while some aspects of the subject matter described herein has been discussed with reference to NRF related messages various other messages may utilize pseudo NF instance IDs or other aspects of the subject matter described herein. For example, an UECM registration request by AMF may utilize a pseudo NF instance ID for identification during a UECM service registration. Further, it will be appreciated that pseudo NF instance IDs may be used in various message types of portions thereof, e.g., a message payload and/or header. For example, a pseudo NF Instance ID may be part of an access token and CCA token. In another example, a pseudo NF instance ID may be in a load control information (LCI) header or an overload control information (OCI) header.

It should be noted that node 200, SM 204, and/or functionality described herein may constitute a special purpose computing device. Further, node 200, SM 204, and/or functionality described herein can improve the technological field of network security and/or message validation in a communications network. For example, by using pseudo NF instance IDs and/or reducing the usage of NF instance IDs to NF registration, NF update, NF deregistration scenarios, malicious activities and their negative consequences (e.g., DoS attacks, customer data theft, etc.) can be mitigated and/or prevented. In this example, by utilizing one or more techniques and/or methods described herein, H-NRF 100 or SM 204 therein can prevent DOS attacks that use leaked NF instance IDs to attempt unauthorized NF updates or NF deregistrations. Further, such techniques and/or methods described herein, may be applicable to multiple services or related interfaces including, for example, nudm-sdm, nudm-uecm, npcf-uepolicy, nsmf-pdusession, nssf-nsselection, nnrf-disc, and/or nnrf-nfm.

The disclosure of each of the following references is incorporated herein by reference in its entirety to the extent not inconsistent herewith and to the extent that it supplements, explains, provides a background for, or teaches methods, techniques, and/or systems employed herein.

REFERENCES 1. 3GPP TS 29.510; 3rd Generation Partnership Project; Technical Specification Group Core Network and Terminals; 5G System; Network Function Repository Services; Stage 3 (Release 17), V17.1.0 (2021 March).
2. 3GPP TS 33.501; 3rd Generation Partnership Project; Technical Specification Group Services and System Aspects; Security Architecture and Procedures for the 5G System; (Release 17), V17.1.0 (2021 March).
3. RFC 4122: A Universally Unique IDentifier (UUID) URN Namespace; Leach, P., Mealling, M. and Salz, R.; (2005).

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for hiding network function (NF) instance identifiers (IDs) in a communications network, the method comprising:
    at an NF repository function (NRF) comprising at least one processor:
        receiving, from a first NF, an NF registration request message for registering a first NF instance of the first NF, wherein the NF registration request message includes a first NF instance identifier (ID) for identifying the first NF instance;
        storing, in a data store, a mapping between the first NF instance ID and at least one pseudo NF instance ID, wherein the data store includes mappings between NF instance IDs and related pseudo NF instance IDs; and
        generating and sending, to the first NF, an NF registration response message including the at least one pseudo NF instance ID for identifying the first NF instance.
2. The method of claim 1 comprising:
    at the first NF:
        receiving, from the NRF, the NF registration response message including the at least one pseudo NF instance ID, wherein each of the at least one pseudo NF instance ID is different from the first NF instance ID;
        storing the at least one pseudo NF instance ID associated with the first NF instance ID; and
        using the at least one pseudo NF instance ID for sender identification when sending a request or response message.
3. The method of claim 1 comprising:
    at the NRF:
        receiving, from a consumer NF instance, an NF discovery request message including at least one query parameter;
        selecting, using the at least one query parameter and the data store, an NF profile including a first pseudo NF instance ID associated with the first NF instance; and
        sending, to the consumer NF instance, the NF profile including the first pseudo NF instance ID.
4. The method of claim 3 wherein the first pseudo NF instance ID is usable by the consumer NF instance to request an access token or an NF subscription associated with the first NF instance.
5. The method claim 3 wherein the first pseudo NF instance ID is usable by the consumer NF instance to communicate with the first NF instance via a service based interface (SBI).
6. The method of claim 1 comprising:
    at the NRF:
        receiving, from a consumer NF instance, a service request message for performing an action associated with the first NF instance, wherein the service request message includes an ID for the first NF instance;
        determining, using the ID and the data store, that the service request message is valid or invalid;
        in response to determining that the service request message is invalid, performing an invalid message action; and
        in response to determining that the service request message is valid, performing a valid message action.
7. The method of claim 6 wherein the invalid message action includes discarding the service request message or notifying a network operator or a management system.
8. The method of claim 6 wherein the service request message includes an NF registration request message, an NF update request message, or an NF deregistration request message.
9. The method of claim 8 wherein determining that the service request message is invalid includes determining that the ID in the service request message is one of the at least one pseudo NF instance ID associated with the first NF instance.
10. The method of claim 1 wherein the first NF includes a producer network function (NF), a policy control function (PCF), a binding support function (BSF), a service communication proxy (SCP), a security edge protection proxy (SEPP), a network slice selection function (NSSF), a network exposure function (NEF), a unified data repository (UDR), or a fifth generation (5G) core NF.
11. A system for hiding network function (NF) instance identifiers (IDs) in a communications network, the system comprising:
    an NF repository function (NRF) comprising:
        at least one processor; and
        a security module implemented by the at least one processor for:
            receiving, from a first NF, an NF registration request message for registering a first NF instance of the first NF, wherein the NF registration request message includes a first NF instance identifier (ID) for identifying the first NF instance;

storing, in a data store, a mapping between the first NF instance ID and at least one pseudo NF instance ID, wherein the data store includes mappings between NF instance IDs and related pseudo NF instance IDs; and generating and sending, to the first NF, an NF registration response message including the at least one pseudo NF instance ID for identifying the first NF instance.

12. The system of claim 11 comprising the first NF, wherein the first NF is configured for:

receiving, from the NRF, the NF registration response message including the at least one pseudo NF instance ID, wherein each of the at least one pseudo NF instance ID is different from the first NF instance ID;

storing the at least one pseudo NF instance ID associated with the first NF instance ID; and using the at least one pseudo NF instance ID for sender identification when sending a request or response message.

13. The system of claim 11 wherein the NRF is configured for:

receiving, from a consumer NF instance, an NF discovery request message including at least one query parameter;

selecting, using the at least one query parameter and the data store, an NF profile including a first pseudo NF instance ID associated with the first NF instance; and sending, to the consumer NF instance, the NF profile including the first pseudo NF instance ID.

14. The system of claim 13 wherein the first pseudo NF instance ID is usable by the consumer NF instance to request an access token or an NF subscription associated with the first NF instance.

15. The system claim 13 wherein the first pseudo NF instance ID is usable by the consumer NF instance to communicate with the first NF instance via a service based interface (SBI).

16. The system of claim 11 wherein the NRF is configured for:

receiving, from a consumer NF instance, a service request message for performing an action associated with the first NF instance, wherein the service request message includes an ID for the first NF instance;

determining, using the ID and the data store, that the service request message is valid or invalid;

in response to determining that the service request message is invalid, performing an invalid message action; and in response to determining that the service request message is valid, performing a valid message action.

17. The system of claim 16 wherein the invalid message action includes discarding the service request message or notifying a network operator or a management system.

18. The system of claim 16 wherein the service request message includes an NF registration request message, an NF update request message, or an NF deregistration request message and wherein determining that the service request message is invalid includes determining that the ID in the service request message is one of the at least one pseudo NF instance ID associated with the first NF instance.

19. The system of claim 11 wherein the first NF includes a producer network function (NF), a policy control function (PCF), a binding support function (BSF), a service communication proxy (SCP), a security edge protection proxy (SEPP), a network slice selection function (NSSF), a network exposure function (NEF), a unified data repository (UDR), or a fifth generation (5G) core NF.

20. A non-transitory computer readable medium having stored thereon executable instructions that when executed by at least one processor of a computer cause the computer to perform steps comprising:

at a network function (NF) repository function (NRF) comprising at least one processor:

receiving, from a first NF, an NF registration request message for registering a first NF instance of the first NF, wherein the NF registration request message includes a first NF instance identifier (ID) for identifying the first NF instance;

storing, in a data store, a mapping between the first NF instance ID and at least one pseudo NF instance ID, wherein the data store includes mappings between NF instance IDs and related pseudo NF instance IDs; and generating and sending, to the first NF, an NF registration response message including the at least one pseudo NF instance ID for identifying the first NF instance.

* * * * *

UNITED STATES PATENT AND TRADEMARK OFFICE
CERTIFICATE OF CORRECTION

PATENT NO. : 11,570,689 B2
APPLICATION NO. : 17/314300
DATED : January 31, 2023
INVENTOR(S) : Rajput et al.

Page 1 of 1

It is certified that error appears in the above-identified patent and that said Letters Patent is hereby corrected as shown below:

In the Specification

In Column 14, Line 48, delete "'ID23'," and insert -- 'PID23', --, therefor.

In Column 14, Line 48, delete "'ID55'." and insert -- 'PID55'. --, therefor.

In Column 16, Line 16, after "'PID1'," insert -- 'PID2', --, therefor.

In the Claims

In Column 20, Line 19, in Claim 5, after "method" insert -- of --, therefor.

In Column 21, Line 34, in Claim 15, after "system" insert -- of --, therefor.

Signed and Sealed this
Nineteenth Day of December, 2023

Katherine Kelly Vidal
*Director of the United States Patent and Trademark Office*